No. 871,577. PATENTED NOV. 19, 1907.
J. DUNKEL.
JOINTED METAL PIPE.
APPLICATION FILED MAY 25, 1907.
3 SHEETS—SHEET 1.
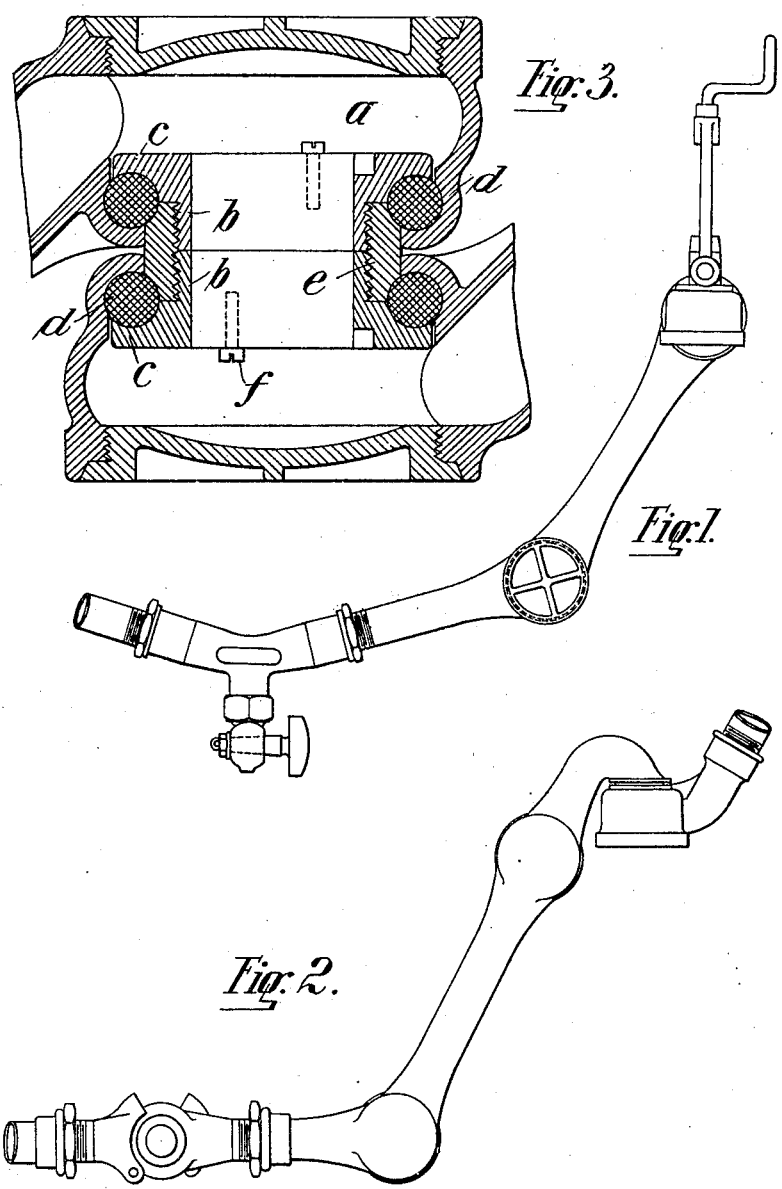

No. 871,577. PATENTED NOV. 19, 1907.
J. DUNKEL.
JOINTED METAL PIPE.
APPLICATION FILED MAY 25, 1907.
3 SHEETS—SHEET 2.
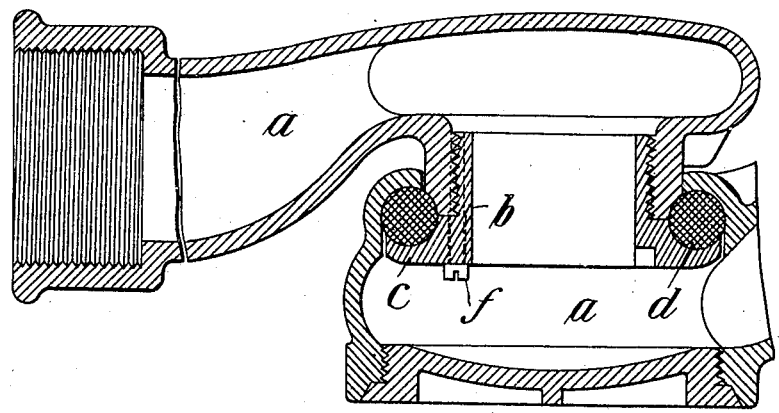
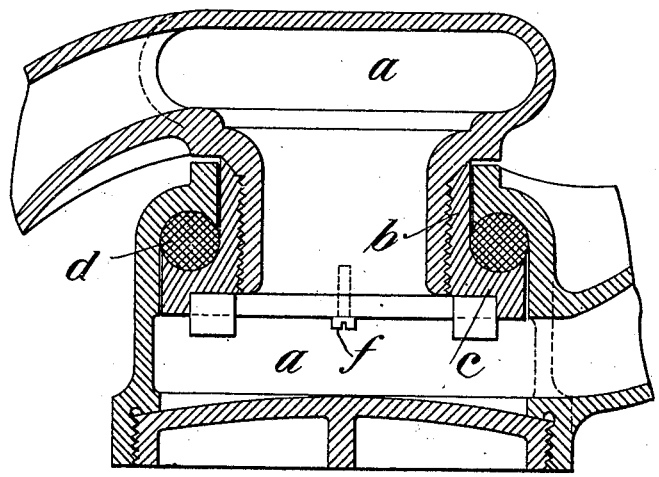
Witnesses:
Inventor
Julius Dunkel
By
James L. Norris
Atty.

No. 871,577. PATENTED NOV. 19, 1907.
J. DUNKEL.
JOINTED METAL PIPE.
APPLICATION FILED MAY 25, 1907.
3 SHEETS—SHEET 3.
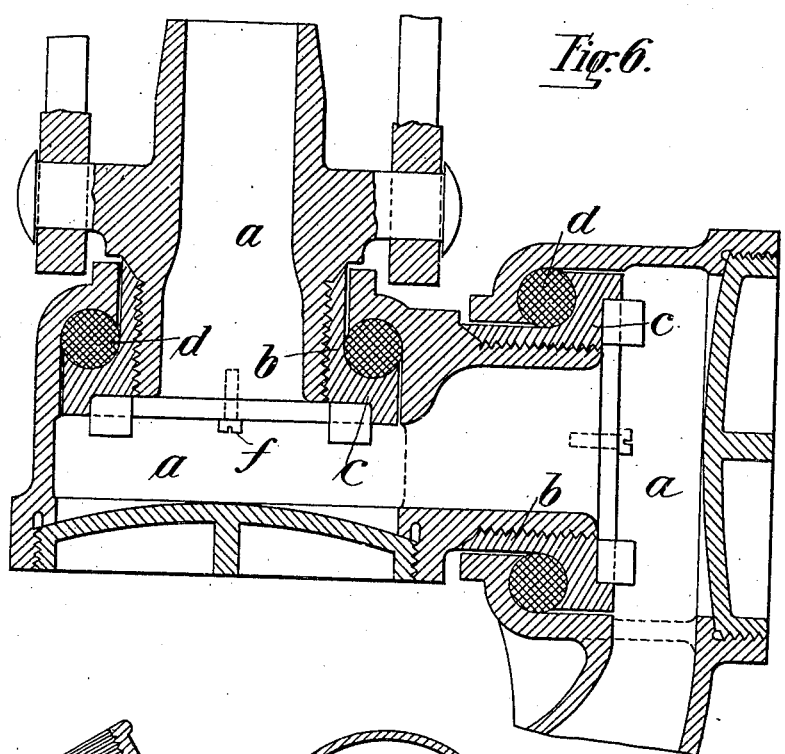
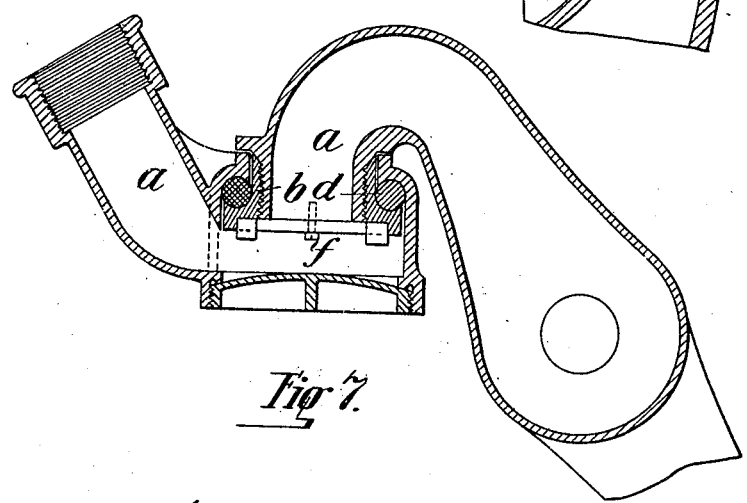

UNITED STATES PATENT OFFICE.

JULIUS DUNKEL, OF LANGFUHR, NEAR DANZIG, GERMANY.

JOINTED METAL PIPE.

No. 871,577.　　　Specification of Letters Patent.　　　Patented Nov. 19, 1907.

Application filed May 25, 1907. Serial No. 375,734.

*To all whom it may concern:*

Be it known that I, JULIUS DUNKEL, a subject of the King of Prussia, residing at Langfuhr, near Danzig, Germany, have invented certain new and useful Improvements in Jointed Metal Pipes, of which the following is a specification.

The jointed pipes shown in the drawing are applicable for use as brake- and heating-fluid pipes in railway working, and are designed to increase the certainty of working.

The improved pipe consists of a number of pipe-members $a$ joined together in a row and coupled by one or more glands $b$ with flanged rims $c$ at their ends. In order to obtain the required flexibility, one (preferably the first) connection between the pipe members, which is placed next to the end of the vehicle, has its axis arranged in a perpendicular position relatively to the plane of the road-bed, in order that the pipe can adapt itself at this place to the motion of the vehicle when passing round curves, or in the case where the brake-pipes are connected together cross-wise between the vehicles, while two further connections between pipe-members have their axes horizontal and parallel to the plane of the rails, in order to provide the necessary flexibility for connecting two such pipes in coupling carriages and also in the up and down motion of the vehicles during working. There is moreover no difficulty in increasing the number of joints in each brake-pipe, yet the provision of three joints in each brake pipe is usually sufficient for working.

Figures 1 and 2 of the drawing respectively show half of a heating pipe connection and a brake-pipe closed by a coupling head. Figs. 3 to 7 of the drawing illustrate various forms of construction of the joint, which work in a quite similar manner.

The simpler forms are designed to reduce the cost of maintenance of such pipes as much as possible, and thoroughly secure the flexibility thereof. It is left to purchasers themselves to choose the arrangement of joints required for each particular case. It is essential, by reason of the said arrangement, that on the first movable member of the pipe arranged next to the vehicle, the axes of the joints at the two ends thereof be put at right angles to each other, that moreover the first gland $b$ for connecting the pipe-members to the fixed pipe on the vehicle shall lie in the longitudinal axis of this first member of the brake-pipe, the other glands however lie at right angles to the axis of the fixed pipe.

In Figs. 3 to 7, the several modifications of the joints are shown differently according to their use. The forms of construction in Figs. 4 to 5 are only designed for joints which are horizontal or parallel to the plane of the road-bed. The forms of construction in Figs. 6 and 7 are applicable only for joints perpendicular to the plane of the rail. In the form of construction shown in Fig. 3, a multiple gland joint, which requires two packing rings, is employed. Differing from this, a joint is shown in Figs. 4 to 7 for connecting the pipe members $a$ by means of single glands $b$, which only require one packing ring. In this form of construction, the single gland $b$ employed is rigidly connected by screw-threads or other auxiliary means with one pipe-member $a$, while the other pipe-member $a$ abutting against the same turns about this single gland $b$ in the same manner as in the construction shown in Fig. 3 and can move in the longitudinal direction of the gland. It is unimportant whether the single gland $b$ has its cylindrical part screwed to the inside of the cylindrical part of the pipe-member $a$ connected therewith, as shown in Fig. 4, or to the outside, as shown in Figs. 5 to 7. Only the conditions of the particular purpose in view can decide whether one or the other form of construction is to be used. As a security against loosening of these screw-threaded joints between the single glands and the pipe-members screwed thereto, and also against separation of the glands $b$ in Fig. 3 composed of several parts, locking screws $f$ are employed.

In order to pack the joints or connections, elastic packings $d$ are used, which are tightly compressed between the rims or edges of the suitably shaped tube-members $a$ and of the flanges $c$ on the glands $b$ only during the use of the pipe or brake-tube when it is filled with fluid under pressure.

In order to stiffen the glands at the joints, a thickened gland-ring $e$ is arranged between the two packing-rings $d$, this gland-ring thus forming a short pipe-member. When not in use, the connection between the pipe-members $a$ and the glands $c$ is quite loose and can be moved very easily, as is necessary for the manipulation of the pipe when preparing for work. The joints in this time of preparation are not fluid-tight and are only closed air-tight on entrance of the working fluid. In order to insure this condition under all circumstances, the pressure-rims on the pipe-members *a* are arranged so that they can be easily turned and moved longitudinally on the glands, and there is moreover a space between each two pipe-members so connected. By this means, friction of the parts against each other which would otherwise be expected and which would ultimately destroy the flexibility, is precluded. By reason of this arrangement, the couplings present a wide range of flexibility, such as can not be obtained even by the india-rubber pipes at present in use.

By this arrangement, the durability of brake- or heating-pipes of this kind is rendered almost unlimited and is limited solely by the wear of the elastic packings.

I prefer that the complemental grooves in a pipe member and gland be circular in cross-section and that the packing ring which fits the same be also circular and of the same radius as those of the grooves, as shown in the various figures of the drawings.

What I claim is:—

An adjustable connection for train pipes and the like embodying a pipe member, and a gland removably fitted in said pipe member and capable of relative rotary and axial movements, and provided with transversely curved complemental grooves, and a packing ring circular in cross section adapted to be compressed between and centered by the said grooves when said pipe member and gland are moved axially by fluid pressure in said pipe member.

In testimony whereof I have hereunto set my hand in presence of two subscribing witnesses.

JULIUS DUNKEL.

Witnesses:
G. SPUMSKI,
FRITZ FREUDEWENT.